C. A. ERICKSON.
CLUTCH.
APPLICATION FILED JAN. 20, 1912.
1,096,781.
Patented May 12, 1914.
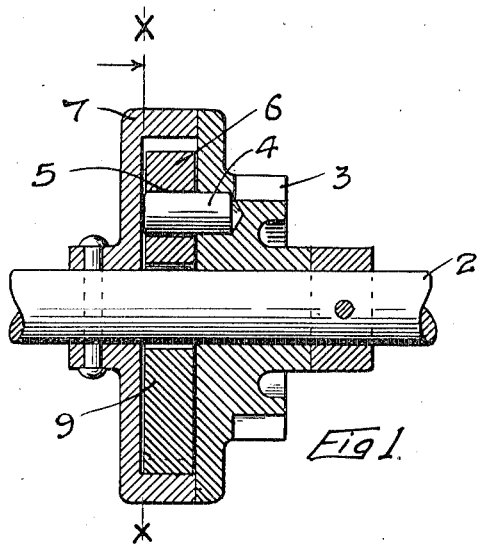
Fig 1.
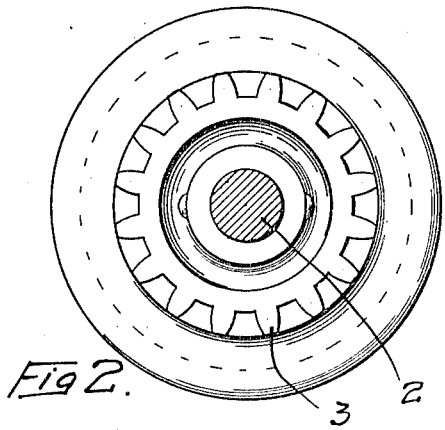
Fig 2.
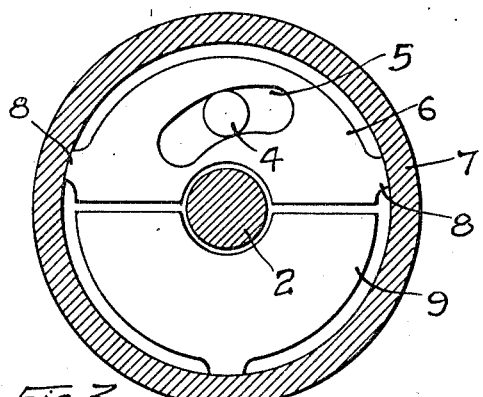
Fig 3. X-X
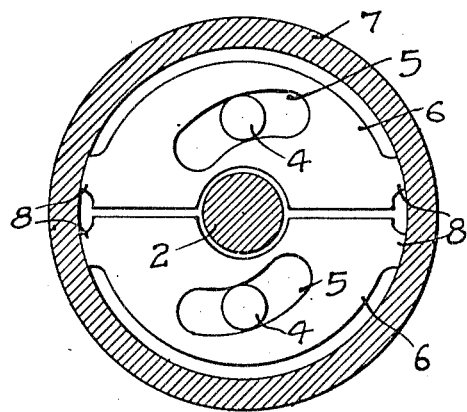
Fig 4.
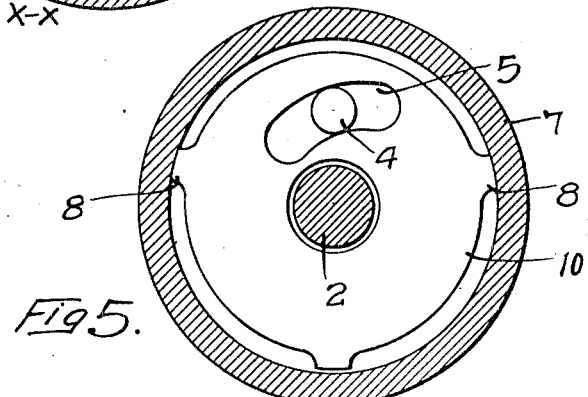
Fig 5.
WITNESSES
M. Walstrom
A. E. Sorensen
INVENTOR
CHARLES A. ERICKSON
BY Paul & Paul
ATTORNEYS

UNITED STATES PATENT OFFICE.

CHARLES A. ERICKSON, OF MINNEAPOLIS, MINNESOTA.

CLUTCH.

1,096,781.  Specification of Letters Patent.  Patented May 12, 1914.

Original application filed February 21, 1910, Serial No. 545,056. Divided and this application filed January 20, 1912. Serial No. 672,411.

*To all whom it may concern:*

Be it known that I, CHARLES A. ERICKSON, of Minneapolis, Hennepin county, Minnesota, have invented certain new and useful Improvements in Clutches, of which the following is a specification.

The object of my invention is to provide a clutch of simple, economical construction and one which will form a positive driving connection.

A further object is to provide a clutch adapted for various uses but designed particularly for use on the axle of a child's hand car.

The invention consists generally in various constructions and combinations, all as hereinafter described and particularly pointed out in the claims.

In the accompanying drawings forming part of this specification, Figure 1 is a detail sectional view of the driving connection with the rear axle, Fig. 2 is a side view of Fig. 1, Fig. 3 is a sectional view on the line *x—x* of Fig. 1, Fig. 4 is a detail view illustrating a modified construction, Fig. 5 is a similar view showing another construction.

In the drawing, 2 represents an axle. A pinion 3 is loosely mounted on the axle and carries a pin 4 which projects into a cam groove 5 formed in a friction shoe or disk 6 that is arranged within a casing 7 that is secured on the axle. The shoe 6 has lugs 8 formed thereon and a corresponding shoe 9 is provided on the other side of the axle and arranged to bear on the opposite wall of the casing. The pin 4, as the pinion revolves, bears on the outer edge of the cam groove 5 and presses the shoe 6 outwardly, causing the lugs 8 to be wedged into the casing 7 and temporarily connecting the loosely mounted pinion with the rigidly mounted casing. The disk segment 9 contacts with the edge of the shoe 6 and prevents it from sliding around in the casing or following the pin and insures the wedging of the lugs 8 against the wall of the casing.

In Fig. 4 the construction shown corresponds substantially to that of Fig. 3 except that two grooves and two pins are shown, being merely a duplication of the construction of Fig. 3. This construction has the effect of increasing the frictional surface of the shoe within the casing and insures a more positive action on the driving mechanism.

In Fig. 5 a modified construction is shown, in which the shoe 10 performs the functions of the shoes 6 and 9 of Fig. 3.

The subject-matter of this application is divided out of my application, Serial No. 545,056, filed February 21, 1910, for child's hand car.

I claim as my invention:

1. A clutch device comprising a shaft, a pinion loosely mounted thereon, a casing secured on said shaft and having a peripheral flange provided with an internal friction surface, a friction shoe encircled by said flange and having its middle portion loosely mounted on said shaft and capable of a limited radial movement thereon, said shoe having a curved slot extending diagonally therein, the longitudinal edges of said slot forming cam surfaces, said shoe having peripheral bearing surfaces thereon and a pin mounted in said pinion and having one end projecting into the slot in said shoe.

2. A clutch device comprising a shaft, a pinion loosely mounted thereon, a casing secured on said shaft and having a peripheral flange provided with an internal friction surface, friction shoes, semi-circular in form, loosely mounted on said shaft and having bearing surfaces to engage the friction surface of said flange upon opposite sides of the center of said shaft, said shoes having slots extending diagonally therein and oppositely curved and provided with cam surfaces on their longitudinal edges, pins mounted in said pinion and having ends projecting into the slots in said shoes.

In witness whereof, I have hereunto set my hand this 17th day of January 1912.

CHARLES A. ERICKSON.

Witnesses:
 GENEVIEVE E. SORENSEN,
 CATHERINE H. REHFUSS.